US012712882B2

(12) United States Patent
Llamas Virgen et al.

(10) Patent No.: US 12,712,882 B2
(45) Date of Patent: Aug. 18, 2026

(54) DYNAMIC INHERITANCE OF SECURITY POLICIES ACROSS DIFFERENT VIRTUAL SECURITY ZONES

(71) Applicant: International Business Machines Corporation, Armonk, NY (US)

(72) Inventors: Paul Llamas Virgen, Guadalajara (MX); Priyansh Jaiswal, Boca Raton, FL (US); Peeyush Jaiswal, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 207 days.

(21) Appl. No.: 18/100,517

(22) Filed: Jan. 23, 2023

(65) Prior Publication Data

US 2024/0250951 A1 Jul. 25, 2024

(51) Int. Cl.
*H04L 9/40* (2022.01)

(52) U.S. Cl.
CPC ............ *H04L 63/105* (2013.01); *H04L 63/20* (2013.01)

(58) Field of Classification Search
CPC .............................. H04L 63/105; H04L 63/20
See application file for complete search history.

(56) References Cited

U.S. PATENT DOCUMENTS 6,871,231 B2 * 3/2005 Morris .............. H04N 1/00132 709/219
7,353,199 B1 * 4/2008 DiStefano, III ....... G06Q 40/00 705/37
8,270,310 B2 * 9/2012 Raleigh ................ H04W 12/08 709/224
8,336,078 B2 * 12/2012 Dixit .................... G06F 21/604 726/1
8,583,683 B2 * 11/2013 Rathod ................ G06Q 20/384 707/770
9,009,794 B2 * 4/2015 Dykeman .............. G06F 21/10 726/4
9,218,496 B2 * 12/2015 Callahan .............. H04L 63/102
10,063,621 B2 * 8/2018 Patel .................. H04L 67/1074
(Continued)

OTHER PUBLICATIONS

Harnal et al., "Efficient and Flexible Role-Based Access Control (EFRBAC) Mechanism for Cloud," EAI Endorsed Transactions on Scalable Information Systems, vol. 7, No. 26, Nov. 18, 2019, 10 pages.

*Primary Examiner* — Gary S Gracia
(74) *Attorney, Agent, or Firm* — Samuel A. Waldbaum

(57) ABSTRACT

A computer-implemented method, according to one embodiment, includes determining whether a first user, the first user being associated with a first virtual security zone that includes a first group of security policies, has a need for a first security policy included in a second virtual security zone associated with a second user. In response to a determination that the first user has a need for the first security policy included in the second virtual security zone, a determination is made as to whether the first user is authorized to at least temporarily inherit the first security policy from the second virtual security zone. The method further includes causing the first security policy to be inherited by the first virtual security zone from the second virtual security zone in response to a determination that the first user is authorized to at least temporarily inherit the first security policy.

18 Claims, 5 Drawing Sheets

(56) References Cited

U.S. PATENT DOCUMENTS

| | | | | |
|---|---|---|---|---|
| 10,097,585 | B2 * | 10/2018 | Bush | H04L 63/107 |
| 10,348,681 | B2 * | 7/2019 | Gearhart | H04L 63/0209 |
| 10,977,380 | B2 * | 4/2021 | Ferrans | H04L 63/102 |
| 11,803,569 | B2 * | 10/2023 | Rohatgi | G06F 16/27 |
| 12,541,726 | B1 * | 2/2026 | Kunchakarra | G06Q 10/0631 |
| 2008/0178254 | A1 * | 7/2008 | Gearhart | H04L 63/0485<br>726/1 |
| 2017/0134433 | A1 * | 5/2017 | Hugenbruch | H04L 63/0218 |
| 2017/0329957 | A1 * | 11/2017 | Vepa | G06F 21/445 |
| 2020/0053091 | A1 * | 2/2020 | Childress | H04L 63/102 |
| 2021/0117561 | A1 * | 4/2021 | Carroll, Jr. | G06F 21/6209 |
| 2021/0185051 | A1 * | 6/2021 | Soryal | G06F 21/6218 |
| 2021/0351980 | A1 * | 11/2021 | Huffman | H04L 63/1416 |
| 2022/0051547 | A1 * | 2/2022 | Skinner | A47K 5/1217 |
| 2022/0060517 | A1 * | 2/2022 | Dozorets | H04L 63/20 |
| 2022/0067208 | A1 * | 3/2022 | Miller | G06Q 30/018 |
| 2022/0366345 | A1 * | 11/2022 | Jones | G06Q 10/06393 |
| 2023/0108031 | A1 * | 4/2023 | Rohatgi | G06F 16/27 |
| 2024/0242343 | A1 * | 7/2024 | Skinner | G06V 10/26 |

* cited by examiner

DYNAMIC INHERITANCE OF SECURITY POLICIES ACROSS DIFFERENT VIRTUAL SECURITY ZONES

BACKGROUND

The present invention relates to security policies, and more specifically, this invention relates to dynamic inheritance of security policies across different virtual security zones.

Conventional hybrid cloud environments often include applications being run on a plurality of different locations. For example, a local database may be used to store relatively sensitive data of a corporation, while off-site third party storage solutions are used to store and/or back-up relatively less sensitive data of the corporation. Communication between the different cloud locations is often secured by implementing security protocols that prevent an unauthorized device from logging into the cloud environment.

SUMMARY

A computer-implemented method, according to one embodiment, includes determining whether a first user, the first user being associated with a first virtual security zone that includes a first group of security policies, has a need for a first security policy included in a second virtual security zone associated with a second user. In response to a determination that the first user has a need for the first security policy included in the second virtual security zone, a determination is made as to whether the first user is authorized to at least temporarily inherit the first security policy from the second virtual security zone. The method further includes causing the first security policy to be inherited by the first virtual security zone from the second virtual security zone in response to a determination that the first user is authorized to at least temporarily inherit the first security policy.

A computer program product, according to another embodiment, includes a computer readable storage medium having program instructions embodied therewith. The program instructions are readable and/or executable by a computer to cause the computer to perform the foregoing method.

A system, according to another embodiment, includes a processor, and logic integrated with the processor, executable by the processor, or integrated with and executable by the processor. The logic is configured to perform the foregoing method.

Other aspects and embodiments of the present invention will become apparent from the following detailed description, which, when taken in conjunction with the drawings, illustrate by way of example the principles of the invention.

DETAILED DESCRIPTION

Figure 1:
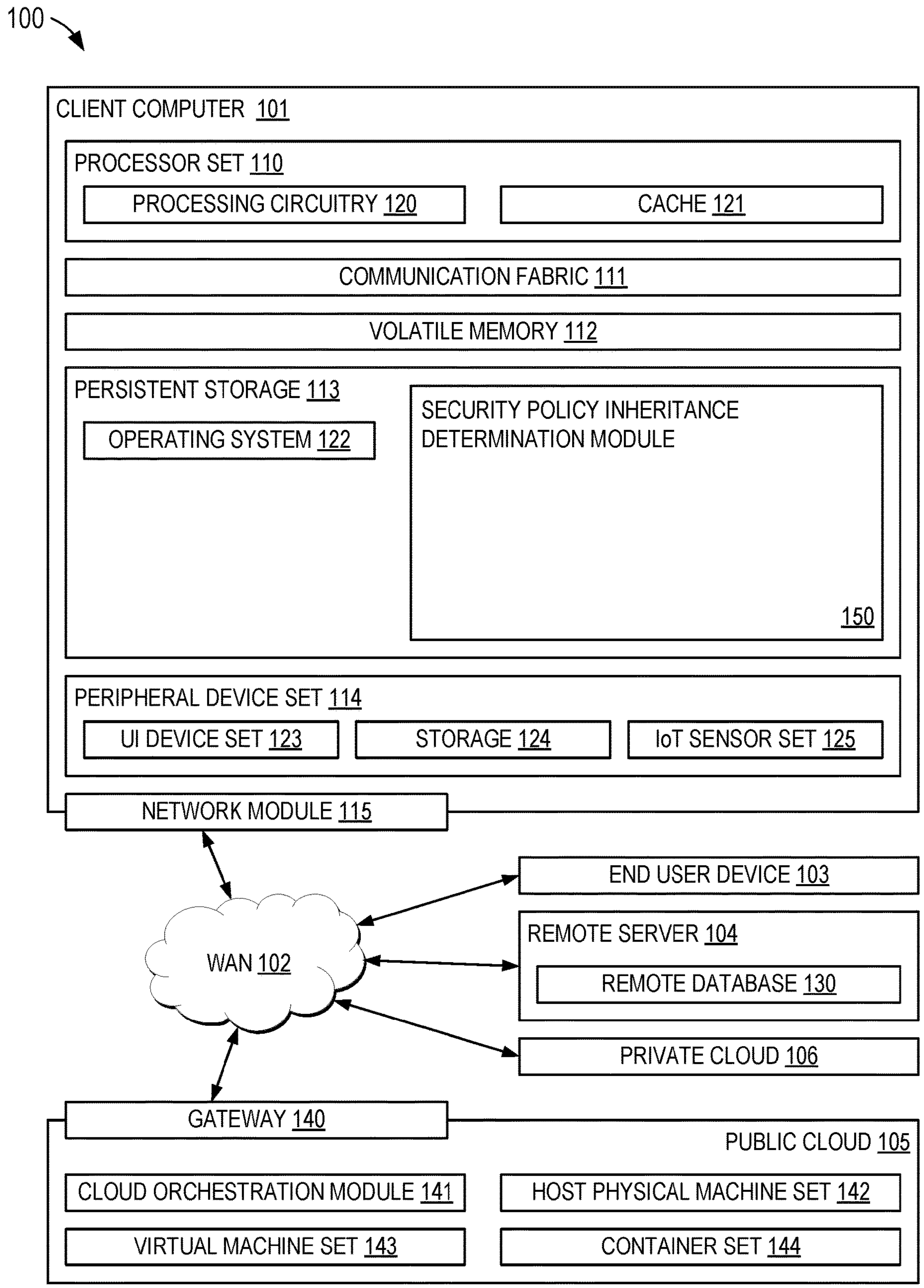
FIG. 1 is a diagram of a computing environment, in accordance with one embodiment of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for dynamic inheritance of security policies across different virtual security zones.

In one general embodiment, a computer-implemented method includes determining whether a first user, the first user being associated with a first virtual security zone that includes a first group of security policies, has a need for a first security policy included in a second virtual security zone associated with a second user. In response to a determination that the first user has a need for the first security policy included in the second virtual security zone, a determination is made as to whether the first user is authorized to at least temporarily inherit the first security policy from the second virtual security zone. The method further includes causing the first security policy to be inherited by the first virtual security zone from the second virtual security zone in response to a determination that the first user is authorized to at least temporarily inherit the first security policy.

In another general embodiment, a computer program product includes a computer readable storage medium having program instructions embodied therewith. The program instructions are readable and/or executable by a computer to cause the computer to perform the foregoing method.

In another general embodiment, a system includes a processor, and logic integrated with the processor, executable by the processor, or integrated with and executable by the processor. The logic is configured to perform the foregoing method.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as security policy inheritance determination module of block 150 for managing dynamic inheritance of security policies across different virtual security zones. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IOT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

In some aspects, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Of course, this logic may be implemented as a method on any device and/or system or as a computer program product, according to various embodiments.

As mentioned elsewhere above, conventional hybrid cloud environments often include applications being run on a plurality of different locations. For example, a local database may be used to store relatively sensitive data of a corporation, while off-site third party storage solutions are used to store and/or back-up relatively less sensitive data of the corporation. Communication between the different cloud locations is often secured by implementing security protocols that prevent an unauthorized device from logging into the cloud environment.

In a hybrid cloud environment, sharing resources among the hybrid clouds is a relatively cumbersome task that is prone to security errors. These security errors are typically introduced by policy makers requiring a check and a double check for each policy when integrating a private cloud with a public cloud. Secured environments are typically always based on granting or removing access for all atomic cloud components. Furthermore, to make management tasks on the internal software components, the entire cloud environment may be required in order to manually provide permissions to execute some tasks, e.g., A, B and/or C tasks, while permissions are not provided to execute some other tasks, e.g., D, E and F. Accordingly, a degree of task complexity associated with such management is relatively high.

Management of access within some cloud environments includes use of role based access control (RBAC). However, there are numerous disadvantages associated with use of RBAC. For example, the creation of RBAC requires a relatively extensive amount of resources and analysis for the proposal. Furthermore, there is no temporary access enabled within conventional RBAC implementations. Instead, if one user requires extended access to a resource, the resource is typically assigned to them directly instead of altering roles as described in various embodiments and approaches described elsewhere herein. Static rules and manual updates are also typically required in conventional cloud environments, which ultimately leads to relatively time consuming and resource intensive operations being performed. Furthermore, a mere minor change in conventional cloud environments is likely to impact different users with the same role, which thereby causes atomic roles, e.g., relatively few rules/permissions for a specific user.

In sharp contrast to the deficiencies of the conventional techniques described above, the techniques of various embodiments and approaches described herein include implementing access-controlled virtual security zones that are each associated with a different user and include one or more security policies. This implementation is flexible in that permissions to use resources may be inherited as security policies, and permanent or temporary rules may be created as a proposal for an administrator. Note that conventional mechanisms that include policy-based security rules are not flexible for atomic changes in this way. Based on such a proposal, dynamic changes may be caused, e.g., by the administrator, in permissions based on, e.g., user's capabilities, user needs, etc., being endorsed by an inspector and/or users in the same environment that consider information, e.g., user history, resources usage, behavior being compliant with the resources, etc., to determine whether to endorse the proposal. As a result, security policies are adapted not for a group, but rather individual users in an automated matter.

Figure 2:
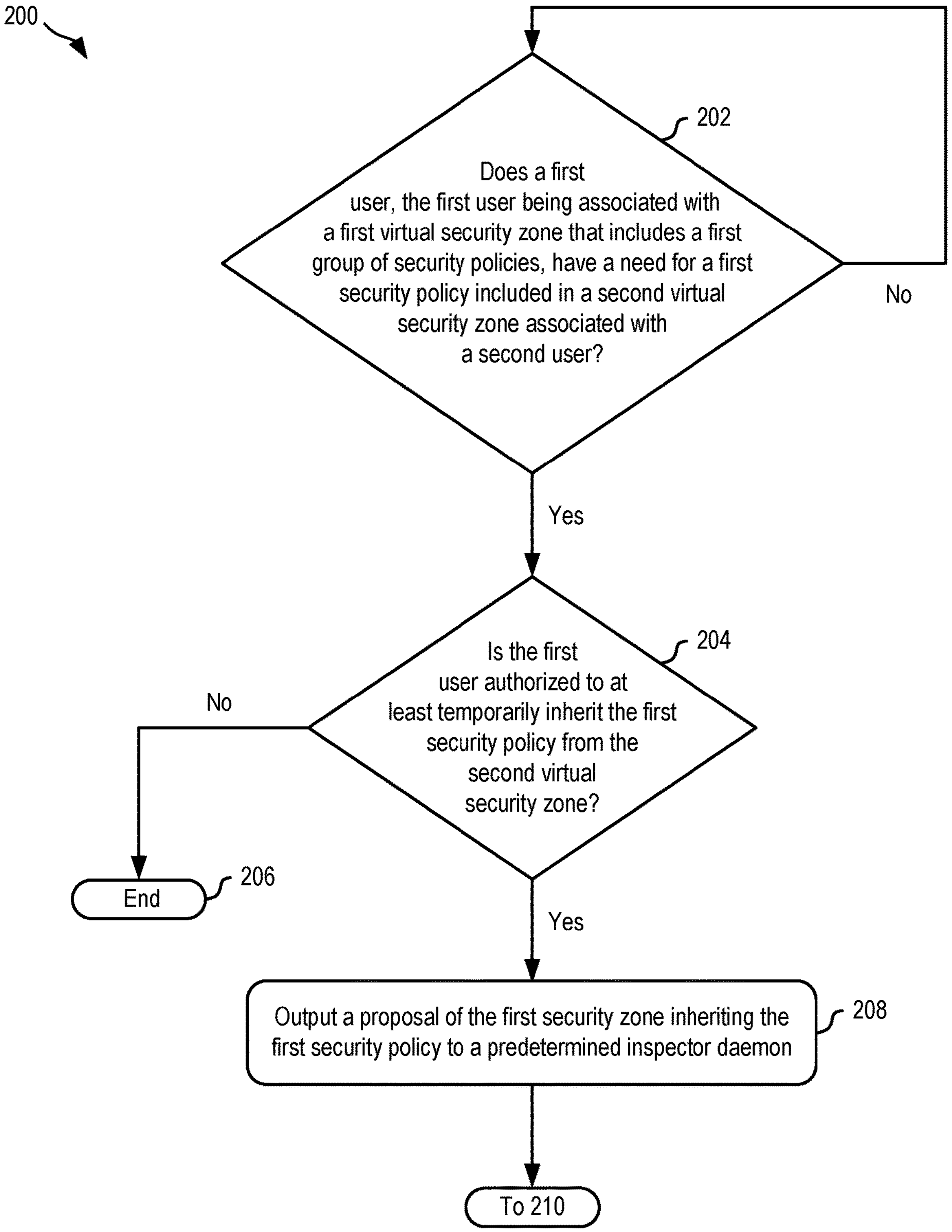
FIG. 2 is a flowchart of a method, in accordance with one embodiment of the present invention.
Figure 2:
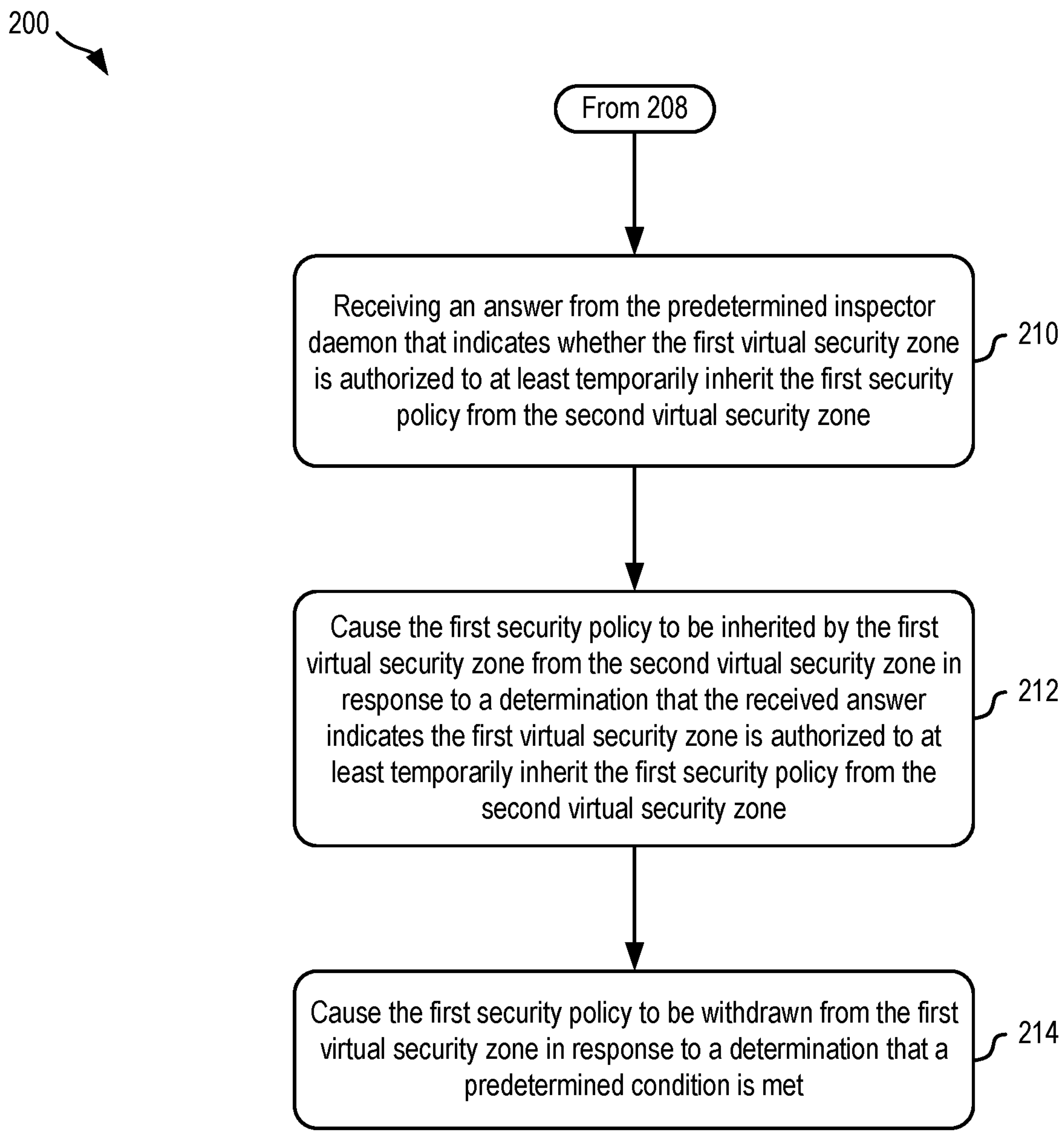

Now referring to FIG. 2, a flowchart of a method 200 is shown, according to one embodiment. The method 200 may be performed in accordance with the present invention in any of the environments depicted in FIGS. 1-4, among others, in various embodiments. Of course, more or fewer operations than those specifically described in FIG. 2 may be included in method 200, as would be understood by one of skill in the art upon reading the present descriptions.

Each of the steps of the method 200 may be performed by any suitable component of the operating environment. For example, in various embodiments, the method 200 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 200. Illustrative processors include, but are not limited to, a central processing unit (CPU), an application specific integrated circuit (ASIC), a field programmable gate array (FPGA), etc., combinations thereof, or any other suitable computing device known in the art.

It may be prefaced that method 200 may be performed in an environment, e.g., a cloud environment, a network, a system, etc., that includes a plurality of user devices, e.g., a computer, a processing circuit, a controller, etc., that are each associated with a different user. In some of such approaches, the environment may additionally and/or alternatively include a plurality of infrastructure components, e.g., logical and/or physical, that may each be secured and accessible depending on the credentials of a user who is attempting to access the component. For example, in some approaches, a plurality of users, e.g., employees, that are associated with an organization that uses the infrastructure components, may each be granted different degrees of access to resources associated with the infrastructure components, e.g., processing resources, access to a predetermined virtual machine, access and/or connection to a predetermined network, data access, network security keys, etc. In preferred approaches, in order to enable such different degree of access, the users may each be assigned to have access to, and thereby be associated with, a different virtual security zone, e.g., a first user is associated with a first virtual security zone, a second user is associated with a second virtual security zone, a third user is associated with a third virtual security zone, etc. For example, method 200 may include associating a user with a virtual security zone in a cloud environment, where the virtual security zone includes resources that are accessible to the user. For context, a "virtual security zone" may be defined as a collection, e.g., group, of security policies that apply to an associated user, and thereby authorize and/or restrict the user from accessing and/or using resources defined by the security policies. The security policies of a given virtual security zone thereby define resources that are accessible to a user, e.g., a user device of the user, associated with the given virtual security zone. For example, a non-limiting list of such security policies may include electronic access to at least some logical partitions of a predetermined server, access to predetermined processing resources, access to a predetermined collection of secured data, access to a predetermined network security key, editing control of resources of predetermined components of a cloud environment, access to and/or control of predetermined components of a distributed system, access to and/or control of predetermined components of a multi-cloud and/or hybrid cloud environment, authorization to store data on a predetermined database, etc.

These security zones preferably allow the users to perform one or more workloads. For example, in one illustrative use case, these workloads may include a scope of work responsibilities that a corporation that owns and/or leases at least some of the infrastructure components at least initially assigns to the users. In some approaches, for one reason or another, a user's virtual security zone may not include a security policy that the user needs. For example, in one of such approaches, a workload of a first user may change over time, causing a first virtual security zone, that is associated with the first user and includes a first group of security policies, to not include a security policy that the first user needs to complete a given task. Accordingly, in some approaches, a determination is made as to whether a first user associated with a first virtual security zone that includes a first group of security policies, has a need for a first security policy, e.g., of a second group of security policies, included in a second virtual security zone associated with a second user, e.g., see decision 202.

The determination of whether the first user has a need for the first security policy may be based on one or more factors, and may depend on the approach. For example, in one approach, the determination may be performed in response to the first user requesting access to a resource associated with the first security policy. In another approach, the determination is based on information obtained by a predetermined inspector daemon, e.g., an inspector virtual machine, that is configured to monitor actions of the first user and/or a first user device used by the first user. In some approaches, the need is determined based on the inspector automatically determining that the first user should have access to the resource, where the determination of the inspector may be based on, e.g., information associated with the first user, the first virtual security zone, other users associated with the first virtual security zone, one or more resources associated with the first security parameter, the second virtual security zone, etc. Note that any monitoring of a user and/or a device used by a user is preferably only performed subsequent to obtaining permission from the user to do so, e.g., an opt-in. Such a predetermined inspector daemon may be configured to identify and record information pertaining to, e.g., a history of actions initiated by the first user with respect to satisfying predetermined security protocols of a network associated with the security policies, the first security policies, a performance record of the first user generated which may be generated with information obtained by a supervisor of the first user, disciplinary writeups of the first user (if any), work promotions of the user that include an increase in work responsibilities, a browser history associated with the first user, etc. The predetermined inspector daemon may additionally and/or alternatively be configured to identify and record information pertaining to a scheduled workload associated with the first user. For example, the scheduled workload may be inspected to determine that the first user has scheduled work tasks that require use of the second resource authorization that the first virtual security zone does not currently include.

In some other approaches, a determination that the first user has a need for the first security policy may be based on a request output by a user device of the first user. For example, assuming that the first user needs to access resources that are not currently accessible based on security policies in the first virtual security zone, the first user may request those resources from the virtual security zone associated with another user that includes the needed security policies. For example, the first user may use a user device to output a request to a second user device of a second user that is associated with a second virtual security zone. In some approaches, the request may request that the second user device reveal which security parameters are currently included in the second virtual security zone and/or a response from the second user device may reveal which security parameters are currently included in the second virtual security zone.

In response to a determination that the first user does not have a need for another security policy, e.g., the first security policy, that is not included in the first virtual security zone, e.g., as illustrated by the "No" logical path of decision 202, monitoring may optionally continue to be performed. In contrast, unlike conventional security policy implementations, the virtual security zones described herein are dynamic in that, in response to a determination that a user associated with a virtual security zone has a need for a security policy that is not included in the user's virtual security zone but is included in a virtual security zone associated with a different user, it may be determined whether the security policy may be at least temporarily inherited by the user's virtual security zone from the virtual security zone associated with the different user. Various approaches for determining whether to cause a security policy to be at least temporarily inherited from another virtual security zone will now be described below.

Decision 204 includes determining whether the first user is authorized to at least temporarily inherit the first security policy from the second virtual security zone. It should be noted that such an inheritance of a security policy may be described as "dynamic" in that the inheritance, e.g., borrowing, and/or revoking of security policies among the different virtual security groups may be made over time according to one or more conditions. For example, in some approaches, the determination of whether the first user is authorized to at least temporarily inherit the first security policy from the second virtual security zone may be performed in response to a determination that the first user has a need for the first security policy included in the second virtual security zone. It should also be noted that, in some approaches, the proposed security policy inheritance is received by a predetermined inspector daemon that is configured to monitor the security policies of a virtual security zone and propose inheritances of security policies in response to a determination that a security policy is needed by a user of another virtual security zone.

In some approaches, the determination of whether the first user is authorized to at least temporarily inherit the first security policy from the second virtual security zone may be at least in part based on whether the first user is endorsed. Accordingly, method 200 may optionally include determining whether the first user is endorsed, e.g., whether other users and/or devices endorse the first virtual security zone at least temporarily inheriting the first security policy and/or whether endorsements have been received for of the first user. For example, in some approaches, method 200 optionally includes outputting a query to a user device of a third user associated with a third virtual security zone. The query is output to determine whether the first user is endorsed for inheriting the first security policy. Dynamic access to the first security policy of the controlled zone, e.g., the second virtual security zone may, in some preferred approaches, only be allowed provided that a determination is made that the specific access to the first security policy is required and need matching is performed by the endorsement policies, e.g., responses to the output query indicate that the first user is endorsed for inheriting the first security policy. In some approaches, the query includes an indication of the inheritance that may potentially be performed. For example, the query may, in some approaches, include a proposal of the first virtual security zone inheriting the first security policy from the second virtual security zone. In some other approaches, in which the first security policy is capable of being inherited from a plurality of candidate security zones that are each determined to include the first security policy needed by the first user, the query may include a plurality of proposals, and the user devices that the query is output to may endorse one or more of the proposals and/or not endorse one of more of the proposals.

A response to the query may be received, e.g., from the third user device. The response may include an indication of whether the first user is endorsed, e.g., for one or more of the proposals.

In some other approaches, the determination of whether the first user is authorized to at least temporarily dynamically inherit the first security policy from the second virtual security zone may additionally and/or alternatively be based on user experience of the first user. For example, a predetermined scheme may specify virtual security zones that are not to be inherited by users that do not have at least a predetermined threshold degree of experience.

In response to a determination that the first user is not authorized to at least temporarily dynamically inherit the first security policy from the second virtual security zone, e.g., as illustrated by the "No" logical path of decision 204, the method optionally ends, e.g., see operation 206, and the first virtual security zone does not inherit the first security policy from the second virtual security zone. Accordingly, the first user does not have access to the first security policy (and resources associated therewith). In some approaches, a determination is made that the first user is not authorized to at least temporarily dynamically inherit the first security policy from the second virtual security zone in response to a determination that at least a predetermined number of endorsements are not received for the first user, e.g., at least one endorsement, two endorsements, ten endorsements, at least a predetermined percentage of received endorsements endorsing the first user rather than not endorsing the first user, etc. In another approach, a determination is made that the first user is not authorized to at least temporarily dynamically inherit the first security policy from the second virtual security zone in response to a determination that the first user does not have at least a predetermined threshold degree of experience.

In response to a determination that the first user is authorized to at least temporarily dynamically inherit the first security policy from the second virtual security zone, e.g., as illustrated by the "Yes" logical path of decision 204, method 200 optionally continues to operation 208. In some approaches, whether or not the first virtual security zone is caused to at least temporarily inherit the first security policy may additionally and/or alternatively depend on whether a predetermined inspector daemon approves of the proposed inheritance of the first security policy. For example, in some approaches, in response to a determination that the first user is authorized to at least temporarily dynamically inherit the first security policy, a proposal of the first virtual security zone inheriting the first security policy from the second virtual security zone is output to a predetermined inspector daemon, e.g., see operation 208. The predetermined inspector daemon may be an agent that is preferably configured to authorize and/or deny proposed dynamic inheritances of security policies, e.g., such as the proposed inheritance of the first security policy by the first virtual security zone from the second virtual security zone. The predetermined inspector daemon may determine whether to authorize and/or deny proposed dynamic inheritances of security policies based on information associated with the user that has a need for the security policy, e.g., a history of actions initiated by the user with respect to satisfying predetermined security protocols of a network associated with the security policies, security policies previously and/or currently included in a virtual security zone of the user that has a need for the security policy, a performance record of the user which may or may not be known to the user, disciplinary writeups of the user (if any), work promotions of the user that include an increase in work responsibilities, a browser history associated with the user, etc.

An answer may be received from the predetermined inspector daemon that indicates whether the first virtual security zone is authorized to dynamically at least temporarily inherit the first security policy from the second virtual security zone, e.g., see operation 210. This way the predetermined inspector daemon acts as a governance over the inheritance. In response to a determination that the first user is authorized to at least temporarily inherit the first security policy, the first security policy may be caused to be inherited by the first virtual security zone from the second virtual security zone. According to a more specific approach, the first security policy may be caused to be inherited by the first virtual security zone from the second virtual security zone in response to a determination that the answer indicates that the first virtual security zone is authorized to inherit the first security policy from the second virtual security zone, e.g., see operation 212. As a result, the first user, e.g., using a user device, is able to access resources associated with the first security policy that is inherited by the first virtual security zone. In some approaches, the inspector daemon may inspect actions of the user to determine, e.g., form up, the inherited rules, e.g., the first security policy, and the inspector agent may propose the rules to be modified or/and approved. In response to a determination that these proposed rules, which may be included in the answer, match the first security policy. e.g., the proposal of the inspector daemon matches the proposal output to the predetermined inspector daemon, the first security policy may be caused to be inherited by the first virtual security zone from the second virtual security zone. For context, causing the first security policy to be inherited by the first virtual security zone from the second virtual security zone may, in some approaches, include issuing an instruction to a daemon that manages assignments of security policies of the first virtual security zone and/or the second virtual security zone. A notification may, in some approaches, be output to the user device of the first user to inform the first user of the at least temporary update performed on the first virtual security zone.

The virtual security zone, from which the first security policy is inherited, may or may not retain the security policy for a duration that the first security policy is inherited by the first virtual security zone. For example, in some approaches, the second virtual security zone includes the first security policy for a duration that the first security policy is inherited by the first virtual security zone. In other words, there may be an intersection of the first virtual security zone and the second virtual security zone for the duration that the first security policy is inherited by the first virtual security zone, and the intersecting portions of the first virtual security zone and the second virtual security zone may include the first security policy. In contrast, in some other approaches, the second virtual security zone may not include the first security policy for a duration that the first security policy is inherited by the first virtual security zone, e.g., as a result of the first security policy being at least temporarily transferred by the first virtual security zone to the second virtual security zone. The second virtual security zone may, in some approaches, regain the first security policy as a result of the first security policy being thereafter optionally revoked from the first virtual security zone. In contrast, the second virtual security zone may, in some approaches, not regain the first security policy as a result of the first security policy being thereafter optionally revoked from the first virtual security zone. Instead, the second virtual security zone may, in one or more of such approaches, only regain the first security policy by inheriting the first security policy from another virtual security zone that includes the first security policy, e.g., in response to a determination that the second user has a need for the first security policy and/or in response to a determination that the first user is authorized to at least temporarily inherit the first security policy from the another virtual security zone.

As mentioned elsewhere herein, assignments of security policies and/or inheritances of security policies to virtual security zones may be dynamically made and may be temporary, depending on the approach. Accordingly, in some approaches, method 200 optionally includes causing an inheritance of a security policy to be withdrawn from a virtual security zone. For example, in some approaches, method 200 includes causing the first security policy to be withdrawn from the first virtual security zone in response to a determination that a predetermined condition is met, e.g., see operation 214. According to several approaches, the predetermined condition may include, e.g., a predetermined amount of time passing, a determination being made that the first user no longer has the need for the first security policy, and in response to a determination being made that a scheduled workload associated with the first user has been completed, etc.

It should be noted that, although various operations described above may be performed with respect to the "first security policy", such determinations may additionally and/or alternatively be performed for a plurality of security policies. Furthermore, in some approaches, determinations may be concurrently and/or sequentially performed with respect to the first security policy and/or other security policies that are included in other virtual security zones, e.g., a third virtual security zone, a fourth virtual security zone, a fifth virtual security zone, etc. In some optional approaches in which each virtual security zone of a plurality of other virtual security zones is determined to include a security policy needed by the first user, method 200 optionally includes prioritizing the results for selection of the virtual security zone to inherit the security policy from. Such prioritization may be performed using information included in responses received by user devices associated with the virtual security zones, and the information may include, e.g., amounts of latency associated with inheriting the security policy, financial costs associated with inheriting the security policy, whether or not the user device associated with the virtual security zone from the security policy is being inherited plans to use the security policy to access resources during a duration of time that the inheritance would be performed, whether or not the user device associated with the virtual security zone from which the security policy is being inherited has agreed to the inheritance, etc. Furthermore, although various approaches above specify that each user may be associated with a different virtual security zone, in some approaches, these different virtual security zones may all be sub-zones of a universal virtual security zone that includes all predetermined security policies. In such approaches, each of the sub-zones of the universal virtual security zone may include at least some of the predetermined security policies.

Numerous benefits are enabled as a result of implementing the techniques of embodiments and approaches described herein in environments in which users maintain different degrees of resource access. For example, as a result of enabling dynamic inheritance of security policies across different virtual security zones, users associated with the different virtual security zones are able to relatively efficiently dynamically inherit needed security policies without having to apply static rules and manual updates which would otherwise cause relatively more processing resources and time to be consumed. Accordingly, these techniques improve performance of computer systems within security policy deployments by reducing an amount of processing that is performed in order to manage security policies. It should also be noted that, temporary access to resources being enabled by dynamic security policy inheritance across virtual security zones has heretofore not been considered in conventional applications. In sharp contrast, conventional techniques require a relatively resource intensive and time consuming process of assigning security policies directly via manual updates. Accordingly, the inventive discoveries disclosed herein with regards to use of dynamic security policy inheritance across virtual security zones proceed contrary to conventional wisdom.

Figure 3A:
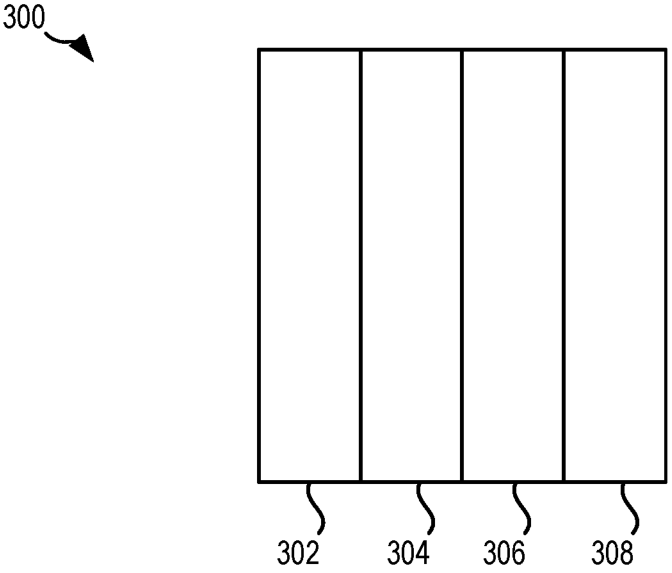
FIG. 3A is a bar graph, in accordance with one embodiment of the present invention.
Figure 3B:
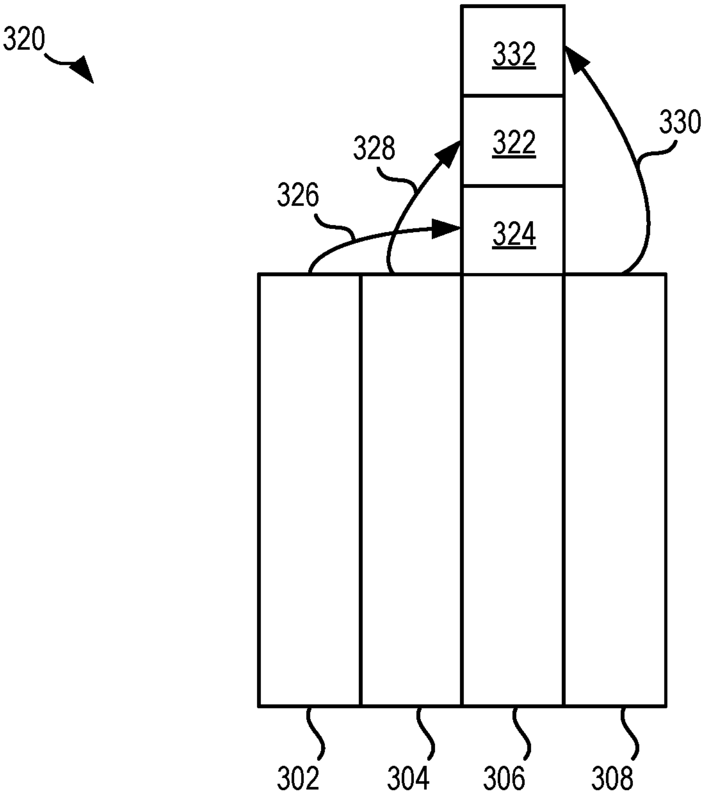
FIG. 3B is a bar graph, in accordance with one embodiment of the present invention.

FIG. 3A-3B depict bar graphs 300 and 320, in accordance with several embodiments. As an option, the present bar graphs 300 and 320 may be implemented in conjunction with features from any other embodiment listed herein, such as those described with reference to the other FIGS. Of course, however, such bar graphs 300 and 320 and others presented herein may be used in various applications and/or in permutations which may or may not be specifically described in the illustrative embodiments listed herein. Further, the bar graphs 300 and 320 presented herein may be used in any desired environment.

Referring first to FIG. 3A, the bar graph 300 includes a first bar 302 that represents security policies included in a first virtual security zone associated with a first user, a second bar 304 that represents security policies included in a second virtual security zone associated with a second user, a third bar 306 that represents security policies included in a third virtual security zone associated with a third user, and a fourth bar 308 that represents security policies included in a fourth virtual security zone associated with a fourth user.

Referring now to FIG. 3B, the bar graph 320 illustrates a modified version of the bar graph 300, based on security policies being inherited by the third virtual security zone associated with the third user. For example, in response to a determination that the third user has a need for a first security policy 324 included in the first virtual security zone, it may be determined whether the third user is authorized to at least temporarily dynamically inherit the first security policy from the first virtual security zone. In response to a determination that the third user is authorized to at least temporarily dynamically inherit the first security policy from the first virtual security zone, the first security policy may be caused to be inherited by the third virtual security zone from the first virtual security zone, e.g., see operation 326. Furthermore, in response to a determination that the third user has a need for a second security policy 322 included in the second virtual security zone, it may be determined whether the third user is authorized to at least temporarily dynamically inherit the second security policy from the second virtual security zone. In response to a determination that the third user is authorized to at least temporarily dynamically inherit the second security policy from the second virtual security zone, the second security policy may be caused to be inherited by the third virtual security zone from the second virtual security zone, e.g., see operation 328. Additionally, in response to a determination that the third user has a need for a third security policy 332 included in the fourth virtual security zone, it may be determined whether the third user is authorized to at least temporarily dynamically inherit the third security policy from the fourth virtual security zone. In response to a determination that the third user is authorized to at least temporarily dynamically inherit the third security policy from the fourth virtual security zone, the third security policy may be caused to be inherited by the third virtual security zone from the fourth virtual security zone, e.g., see operation 330. Note that the security policy 332, the security policy 322 and the security policy 324 represent deltas of changes in the security policies.

Figure 4:
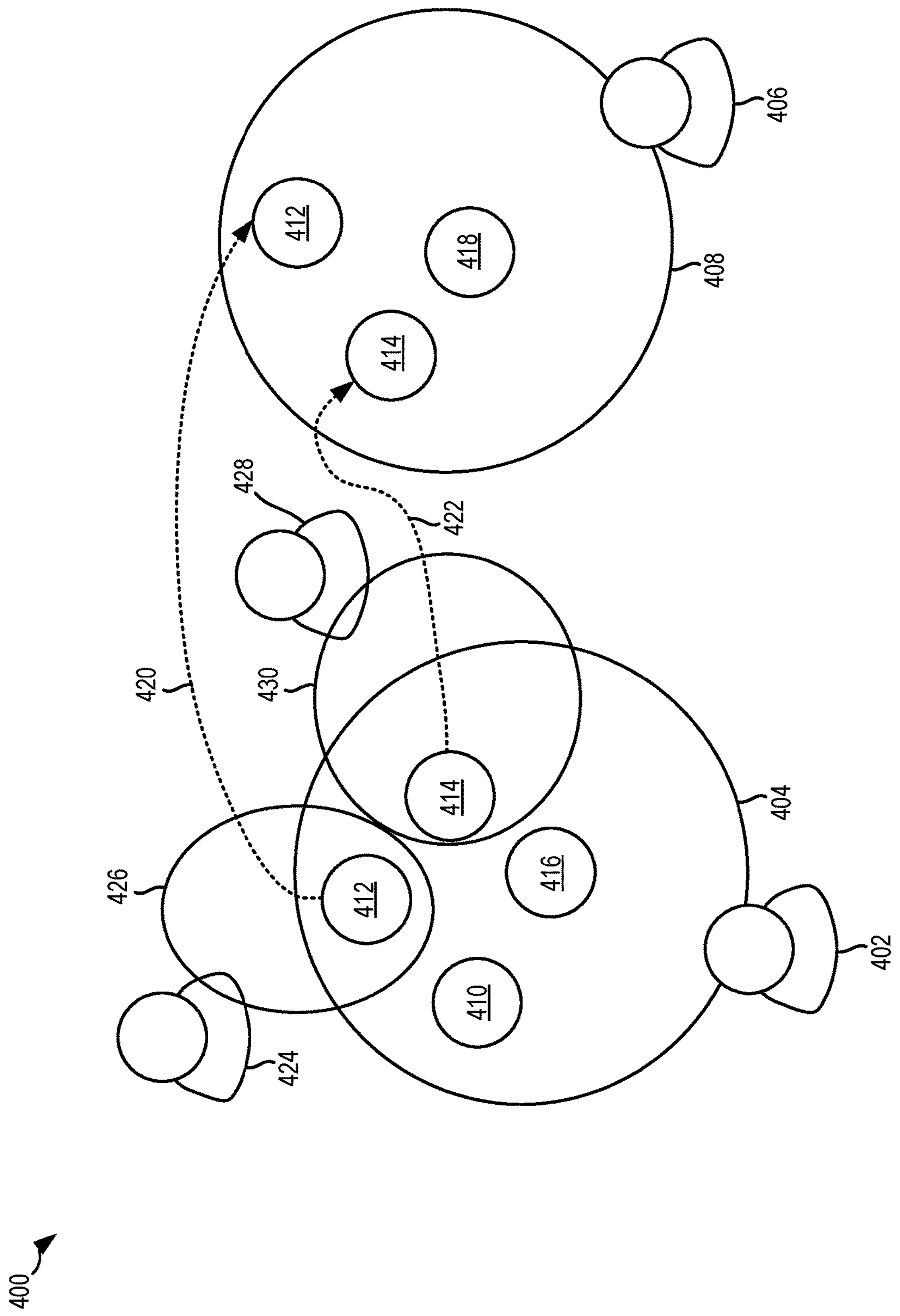
FIG. 4 is a representation, in accordance with one embodiment of the present invention.

FIG. 4 depicts a representation 400, in accordance with one embodiment. As an option, the present representation 400 may be implemented in conjunction with features from any other embodiment listed herein, such as those described with reference to the other FIGS. Of course, however, such representation 400 and others presented herein may be used in various applications and/or in permutations which may or may not be specifically described in the illustrative embodiments listed herein. Further, the representation 400 presented herein may be used in any desired environment.

The representation 400 includes a first user 402 that is associated a first virtual security zone 404, and a second user 406 that is associated a second virtual security zone 408. The first virtual security zone includes a plurality of security policies, e.g., a first security policy 410, a second security policy 412, a third security policy 414 and a fourth security policy 416. The second first virtual security zone includes a fifth security policy 418. The second first virtual security zone also includes the second security policy 412 which is inherited from the first virtual security zone in operation 420, and the third security policy 414 which is inherited from the first virtual security zone in operation 422. In some approaches, the second security policy 412 is a network related rule that defines a scope of access that a user is granted in the network in response to a determination that the second security policy is included in a virtual security zone associated with the user. The third security policy 414 may be assumed to be a virtual machine related rule that defines a scope of access that a user is granted to a virtual machine in response to a determination that the third security policy is included in a virtual security zone associated with the user.

The representation also includes a plurality of inspector daemons which are entities that are configured to provide insights about the specific virtual security zones and accumulate access requests to accumulate rules to be endorsed. For example, a first inspector daemon 424 is configured to provide insight about a first portion 426 of the first virtual security network that involves network security policies, and a second inspector daemon 428 is configured to provide insight about a second portion 430 of the first virtual security network that involves virtual machine security policies. Various descriptions below detail the modifications of the virtual security zones that enable the inheritances of the security policies 412 and 414 by the second virtual security zone from the first virtual security zone, in accordance with one illustrative approach.

In some approaches, in an attempt for the first user to access the virtual machine, the second user may perform an action on a user device such as entering a username and password to the virtual machine using a secure shell connection (ssh), e.g., action: ssh user@password→VM Inspector, and the inspector 428 may observe this action. The second user may then attempt to perform another action that includes a current snapshot of the virtual machine, e.g., action: Snapshot current VM→VM Inspector, which the inspector 428 may also observe. The second user may then attempt to perform another action that includes changing the network, e.g., action: Network change→Network Inspector, which may be observed by the network inspector 424.

In response to being informed of such actions and/or observing such actions, the inspectors may accumulate and associate the actions to specific security policies, e.g., rules. In some approaches, in order for the second virtual security zone to inherit these security policies, the second user may need to be endorsed by one or more other users, e.g., such as members of the user's team. Accordingly, it may be determined whether the second user is endorsed for inheriting the security policies. In some approaches, the virtual machine inspector daemons may be queried to make such a determination, e.g., second user: ssh access→endorsed by Person A for X time to inherit the security policy 414, second user: Snapshot VMs→Endorsed by the virtual machine inspector for X time to inherit the security policy 414, and second user: changes in network→Endorsed by Person A to inherit the security policy 412.

In some approaches, the inheritance of security policies by one virtual security zone from another virtual security zone may be proposed by one or more of the inspectors. For example, a proposal for the security policy 414 to be inherited by the second virtual security zone from the first virtual security zone may be proposed, e.g., the second user→Access to hostname for X time→From the first user and the second user→Snapshot ability enabled for X time→from the first user. In another example, a proposal for the security policy 412 to be inherited by the second virtual security zone from the first virtual security zone may be proposed, e.g., the second user→Network changes ability for permanent time→From the first user. In other words, in some approaches, as a result, a proposal of one or more security policies being applied based on the endorsements from other security zones may be established.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:

determining whether a first user, the first user being associated with a first virtual security zone that includes a first group of security policies, has a need for a first security policy included in a second virtual security zone associated with a second user;

in response to a determination that the first user has a need for the first security policy included in the second virtual security zone, determining whether the first user is authorized to at least temporarily inherit the first security policy from the second virtual security zone, wherein the determination of whether the first user has the need for the first security policy is based on information obtained by a predetermined inspector daemon that is configured to monitor actions of the first user and determine, based on information associated with the first user, whether the first user has the need for the security policy, wherein the information includes a performance record of the first user which is not known to the first user, wherein the performance record details disciplinary write-ups of the first user; and in response to a determination that the first user is authorized to at least temporarily inherit the first security policy, causing the first security policy to be inherited by the first virtual security zone from the second virtual security zone.

2. The computer-implemented method of claim 1, wherein the second virtual security zone includes the first security policy for a duration that the first security policy is inherited by the first virtual security zone, wherein the information further includes work promotions of the first user that include an increase in work responsibilities.

3. The computer-implemented method of claim 1, wherein the second virtual security zone does not include the first security policy for a duration that the first security policy is inherited by the first virtual security zone.

4. The computer-implemented method of claim 1, wherein the security policies are selected from the group consisting of: electronic access to at least some logical partitions of a predetermined server, access to predetermined processing resources, access to a predetermined collection of secured data, access to a predetermined network security key.

5. The computer-implemented method of claim 1, comprising: outputting a query to a user device of a third user associated with a third virtual security zone, wherein the query is output to determine whether the first user is endorsed for inheriting the first security policy, wherein the determination of whether the first user is authorized to at least temporarily inherit the first security policy from the second virtual security zone is based on user experience of the first user and endorsements of the first user.

6. The computer-implemented method of claim 1, wherein the information is selected from the group consisting of: a history of actions initiated by the first user with respect to satisfying predetermined security protocols of a network associated with the security policies, the first security policies, and a scheduled workload associated with the first user, wherein the scheduled workload associated with the first user includes the first user having scheduled work tasks that require use of a resource authorization that the first virtual security zone does not currently include.

7. The computer-implemented method of claim 1, comprising: in response to a determination that the first user is authorized to at least temporarily inherit the first security policy, outputting a proposal of the first virtual security zone inheriting the first security policy to a predetermined inspector daemon that is configured to authorize and/or deny proposed inheritances of security policies; and receiving an answer from the predetermined inspector daemon that indicates whether the first virtual security zone is authorized to at least temporarily inherit the first security policy from the second virtual security zone, wherein the first security policy is caused to be inherited by the first virtual security zone from the second virtual security zone in response to a determination that the answer indicates that the first virtual security zone is authorized to inherit the first security policy from the second virtual security zone.

8. The computer-implemented method of claim 1, comprising: causing the first security policy to be withdrawn from the first virtual security zone in response to a predetermined amount of time passing.

9. A computer program product, the computer program product comprising a computer readable storage medium having program instructions embodied therewith, the program instructions readable and/or executable by a computer to cause the computer to:

determine, by the computer, whether a first user, the first user being associated with a first virtual security zone that includes a first group of security policies, has a need for a first security policy included in a second virtual security zone associated with a second user;

in response to a determination that the first user has a need for the first security policy included in the second virtual security zone, determine, by the computer, whether the first user is authorized to at least temporarily inherit the first security policy from the second virtual security zone, wherein the determination of whether the first user has the need for the first security policy is based on information obtained by a predetermined inspector daemon that is configured to monitor actions of the first user and determine, based on information associated with the first user, whether the first user has the need for the security policy, wherein the information includes a performance record of the first user which is not known to the first user, wherein the performance record details disciplinary writeups of the first user; and in response to a determination that the first user is authorized to at least temporarily inherit the first security policy, cause, by the computer, the first security policy to be inherited by the first virtual security zone from the second virtual security zone.

10. The computer program product of claim 9, wherein the second virtual security zone includes the first security policy for a duration that the first security policy is inherited by the first virtual security zone, wherein the information further includes work promotions of the first user that include an increase in work responsibilities.

11. The computer program product of claim 9, wherein the second virtual security zone does not include the first security policy for a duration that the first security policy is inherited by the first virtual security zone.

12. The computer program product of claim 9, wherein the security policies are selected from the group consisting of: electronic access to at least some logical partitions of a predetermined server, access to predetermined processing resources, access to a predetermined collection of secured data, access to a predetermined network security key.

13. The computer program product of claim 9, comprising: outputting a query to a user device of a third user associated with a third virtual security zone, wherein the query is output to determine whether the first user is endorsed for inheriting the first security policy, wherein the determination of whether the first user is authorized to at least temporarily inherit the first security policy from the second virtual security zone is based on user experience of the first user and endorsements of the first user.

14. The computer program product of claim 9, wherein the information is selected from the group consisting of: a history of actions initiated by the first user with respect to satisfying predetermined security protocols of a network associated with the security policies, the first security policies, and a scheduled workload associated with the first user, wherein the scheduled workload associated with the first user includes the first user having scheduled work tasks that require use of a resource authorization that the first virtual security zone does not currently include.

15. The computer program product of claim 9, the program instructions readable and/or executable by the computer to cause the computer to: in response to a determination that the first user is authorized to at least temporarily inherit the first security policy, output, by the computer, a proposal of the first virtual security zone inheriting the first security policy to a predetermined inspector daemon that is configured to authorize and/or deny proposed inheritances of security policies; and receive, by the computer, an answer from the predetermined inspector daemon that indicates whether the first virtual security zone is authorized to at least temporarily inherit the first security policy from the second virtual security zone, wherein the first security policy is caused to be inherited by the first virtual security zone from the second virtual security zone in response to a determination that the answer indicates that the first virtual security zone is authorized to inherit the first security policy from the second virtual security zone.

16. The computer program product of claim 9, the program instructions readable and/or executable by the computer to cause the computer to: cause, by the computer, the first security policy to be withdrawn from the first virtual security zone in response to a predetermined amount of time passing.

17. A system, comprising:

a processor; and logic integrated with the processor, executable by the processor, or integrated with and executable by the processor, the logic being configured to:

determine whether a first user, the first user being associated with a first virtual security zone that includes a first group of security policies, has a need for a first security policy included in a second virtual security zone associated with a second user;

in response to a determination that the first user has a need for the first security policy included in the second virtual security zone, determine whether the first user is authorized to at least temporarily inherit the first security policy from the second virtual security zone, wherein the determination of whether the first user has the need for the first security policy is based on information obtained by a predetermined inspector daemon that is configured to monitor actions of the first user and determine, based on information associated with the first user, whether the first user has the need for the security policy, wherein the information includes a performance record of the first user which is not known to the first user, wherein the performance record details disciplinary writeups of the first user; and in response to a determination that the first user is authorized to at least temporarily inherit the first security policy, cause the first security policy to be inherited by the first virtual security zone from the second virtual security zone.

18. The system of claim 17, wherein the second virtual security zone includes the first security policy for a duration that the first security policy is inherited by the first virtual security zone, wherein the information further includes work promotions of the first user that include an increase in work responsibilities.

* * * * *